(12) United States Patent
Sakuyama et al.

(10) Patent No.: US 8,122,379 B2
(45) Date of Patent: Feb. 21, 2012

(54) ZOOMING OPERATIONS AND MAGNIFICATION FOR GROUPS OF IMAGES

(75) Inventors: Hiroyuki Sakuyama, Tokyo (JP); Shogo Oneda, Tokyo (JP); Chihiro Hamatani, Tokyo (JP); Junichi Hara, Kanagawa (JP); Taku Kodama, Kanagawa (JP); Maiko Takenaka, Kanagawa (JP); Tamon Sadasue, Tokyo (JP); Koji Kobayashi, Kanagawa (JP); Hirohisa Inamoto, Kanagawa (JP); Yuka Kihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 670 days.

(21) Appl. No.: 12/263,335

(22) Filed: Oct. 31, 2008

(65) Prior Publication Data

US 2009/0119585 A1    May 7, 2009

(30) Foreign Application Priority Data

Nov. 6, 2007  (JP) .................................. 2007-288555

(51) Int. Cl.
*G06F 17/00* (2006.01)
(52) U.S. Cl. ........................................ 715/838; 715/802
(58) Field of Classification Search .................. 715/273, 715/838, 802
See application file for complete search history.

(56) References Cited

U.S. PATENT DOCUMENTS

| 6,545,687 | B2 * | 4/2003 | Scott et al. | 345/629 |
| 7,725,837 | B2 * | 5/2010 | Wong et al. | 715/815 |
| 2007/0101299 | A1 * | 5/2007 | Shaw et al. | 715/853 |
| 2009/0313267 | A1 * | 12/2009 | Girgensohn et al. | 707/100 |

FOREIGN PATENT DOCUMENTS

| JP | B 3614235 | 10/1997 |
| JP | A 2004-178384 | 6/2004 |
| JP | A 2004-258838 | 9/2004 |
| JP | A 2007-286864 | 11/2007 |

* cited by examiner

*Primary Examiner* — Doug Hutton, Jr.
*Assistant Examiner* — Andrew McIntosh
(74) *Attorney, Agent, or Firm* — Blakely, Sokoloff, Taylor & Zafman LLP

(57) ABSTRACT

A disclosed image display apparatus for displaying multiple images on a single screen includes a magnification unit configured to, in response to a zooming operation on the screen, magnify distances between centroids of first group images included in the multiple images and magnify the first group images; and a display control unit configured to display in a space of the magnified distances one or more images different from the multiple images. A magnification rate of the distances between the centroids has a nonlinear relationship to a magnification rate of the first group images, and within an extent of the nonlinear relationship, the magnification rate of the distances between the centroids has a predetermined range in which the magnification rate of the first group images is larger than the magnification rate of the distances between the centroids.

6 Claims, 20 Drawing Sheets

PRIOR ART

PRIOR ART

FIG.7

| 3LL RESOLUTION LEVEL 0 | 3HL RESOLUTION LEVEL 1 | 2HL RESOLUTION LEVEL 2 | 1HL RESOLUTION LEVEL 3 |
|---|---|---|---|
| 3LH RESOLUTION LEVEL 1 | 3HH RESOLUTION LEVEL 1 | | |
| 2LH RESOLUTION LEVEL 2 | | 2HH RESOLUTION LEVEL2 | |
| 1LH RESOLUTION LEVEL 3 | | | 1HH RESOLUTION LEVEL 3 |

| LAYER>>RESOLUTION LEVEL>>COMPONENT>>POSITION |
|---|
| RESOLUTION LEVEL>>LAYER>>COMPONENT>>POSITION |
| RESOLUTION LEVEL>>POSITION>>COMPONENT>>LAYER |
| POSITION>>COMPONENT>>RESOLUTION LEVEL>>LAYER |
| COMPONENT>>POSITION>>RESOLUTION LEVEL>>LAYER |

FIG.10

| SOC | Main Header | SOT | Tile-part Header | SOD | RESOLUTION LEVEL 0 | RESOLUTION LEVEL 1 | RESOLUTION LEVEL... | EOC |

FIG.11

| RLCP | PACKET 0 | PACKET 1 | PACKET 2 | PACKET 3 | PACKET 4 | PACKET 5 |
|---|---|---|---|---|---|---|
| | RESOLUTION LEVEL 0 | RESOLUTION LEVEL 0 | RESOLUTION LEVEL 0 | RESOLUTION LEVEL 0 | RESOLUTION LEVEL 0 | RESOLUTION LEVEL 0 |
| | LAYER 0 | LAYER 0 | LAYER 0 | LAYER 1 | LAYER 1 | LAYER 1 |
| | COMPONENT 0 | COMPONENT 1 | COMPONENT 2 | COMPONENT 0 | COMPONENT 1 | COMPONENT 2 |
| | PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| RESOLUTION LEVEL 1 | RESOLUTION LEVEL 1 | RESOLUTION LEVEL 1 | RESOLUTION LEVEL 1 | RESOLUTION LEVEL 1 | RESOLUTION LEVEL 1 |
| LAYER 0 | LAYER 0 | LAYER 0 | LAYER 1 | LAYER 1 | LAYER 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 12 | PACKET 13 | PACKET 14 | PACKET 15 | PACKET 16 | PACKET 17 |
|---|---|---|---|---|---|
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| LAYER 0 | LAYER 0 | LAYER 0 | LAYER 0 | LAYER 0 | LAYER 0 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 18 | PACKET 19 | PACKET 20 | PACKET 21 | PACKET 22 | PACKET 23 |
|---|---|---|---|---|---|
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| LAYER 0 | LAYER 0 | LAYER 0 | LAYER 0 | LAYER 0 | LAYER 0 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| PACKET 24 | PACKET 25 | PACKET 26 | PACKET 27 | PACKET 28 | PACKET 29 |
|---|---|---|---|---|---|
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| LAYER 1 | LAYER 1 | LAYER 1 | LAYER 1 | LAYER 1 | LAYER 1 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 30 | PACKET 31 | PACKET 32 | PACKET 33 | PACKET 34 | PACKET 35 |
|---|---|---|---|---|---|
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| LAYER 1 | LAYER 1 | LAYER 1 | LAYER 1 | LAYER 1 | LAYER 1 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

(a)

| SOT | Lsot | Isot | Psot | TPsot | TNsot |
|---|---|---|---|---|---|

(b)

| Parameter | Size(bits) | Values | |
|---|---|---|---|
| SOT | 16 | 0xff90 | SIZE OF MARKER SEGMENT |
| Lsot | 16 | 10 | |
| Isot | 16 | 0~65534 | TILE NUMBER START WITH 0 NUMBER IN RASTER ORDER |
| Psot | 32 | 12~(2**32-1) | LENGTH OF TILE-PART EOC IS ENDED WHEN 0 IS SPECIFIED |
| TPsot | 8 | 0~254 | TILE-PART NUMBER ORDER NUMBERS REFERRED TO WHEN CAUSING DECODER TO PERFORM PLAYBACK IN ORDER DIFFERENT FROM USUAL |
| TNsot | 8 | 0~255 | TILE-PART NUMBER INDICATE EITHER ACCURATE TILE-PART NUMBER OR 0 IN CASE OF 0, NUMBER OF TILES DOES NOT FOLLOW DEFINITION OF THE TILE-PART |

RLCP

TILE-PART 0

| PACKET 0 | PACKET 1 | PACKET 2 | PACKET 3 | PACKET 4 | PACKET 5 |
|---|---|---|---|---|---|
| RESOLUTION LEVEL 0 | RESOLUTION LEVEL 0 | RESOLUTION LEVEL 0 | RESOLUTION LEVEL 0 | RESOLUTION LEVEL 0 | RESOLUTION LEVEL 0 |
| LAYER 0 | LAYER 0 | LAYER 0 | LAYER 1 | LAYER 1 | LAYER 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

TILE-PART 1

| PACKET 6 | PACKET 7 | PACKET 8 | PACKET 9 | PACKET 10 | PACKET 11 |
|---|---|---|---|---|---|
| RESOLUTION LEVEL 1 | RESOLUTION LEVEL 1 | RESOLUTION LEVEL 1 | RESOLUTION LEVEL 1 | RESOLUTION LEVEL 1 | RESOLUTION LEVEL 1 |
| LAYER 0 | LAYER 0 | LAYER 0 | LAYER 1 | LAYER 1 | LAYER 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

TILE-PART 2

| PACKET 12 | PACKET 13 | PACKET 14 | PACKET 15 | PACKET 16 | PACKET 17 |
|---|---|---|---|---|---|
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| LAYER 0 | LAYER 0 | LAYER 0 | LAYER 0 | LAYER 0 | LAYER 0 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 18 | PACKET 19 | PACKET 20 | PACKET 21 | PACKET 22 | PACKET 23 |
|---|---|---|---|---|---|
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| LAYER 0 | LAYER 0 | LAYER 0 | LAYER 0 | LAYER 0 | LAYER 0 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| PACKET 24 | PACKET 25 | PACKET 26 | PACKET 27 | PACKET 28 | PACKET 29 |
|---|---|---|---|---|---|
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| LAYER 1 | LAYER 1 | LAYER 1 | LAYER 1 | LAYER 1 | LAYER 1 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 30 | PACKET 31 | PACKET 32 | PACKET 33 | PACKET 34 | PACKET 35 |
|---|---|---|---|---|---|
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| LAYER 1 | LAYER 1 | LAYER 1 | LAYER 1 | LAYER 1 | LAYER 1 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

(a)

| COD | Lcod | Scod | SGcod | SPcod |
|---|---|---|---|---|

(b)

| Parameter | Size(bits) | Values |
|---|---|---|
| COD | 16 | 0xff52 |
| Lcod | 16 | 12~45 |
| Scod | 8 | TABLE 8 | SIZE OF MARKER SEGMENT |
| SGcod | 32 | TABLE 9 | CODING STYLE FOR ENTIRE COMPONENTS |
| SPcod | variable | TABLE 10 | PARAMETERS IN CODING STYLE INDEPENDENT OF COMPONENTS |
| | | | PARAMETERS IN CODING STYLE PERTAINING TO COMPONENTS |

(c)

| Values | PROGRESSIVE ORDER |
|---|---|
| 0000_0000 | LAYER>>RESOLUTION LEVEL>>COMPONENT>>POSITION |
| 0000_0001 | RESOLUTION LEVEL>>LAYER>>COMPONENT>>POSITION |
| 0000_0010 | RESOLUTION LEVEL>>POSITION>>COMPONENT>>LAYER |
| 0000_0011 | POSITION>>COMPONENT>>RESOLUTION LEVEL>>LAYER |
| 0000_0100 | COMPONENT>>POSITION>>RESOLUTION LEVEL>>LAYER |
| OTHERS ARE RESERVED | |

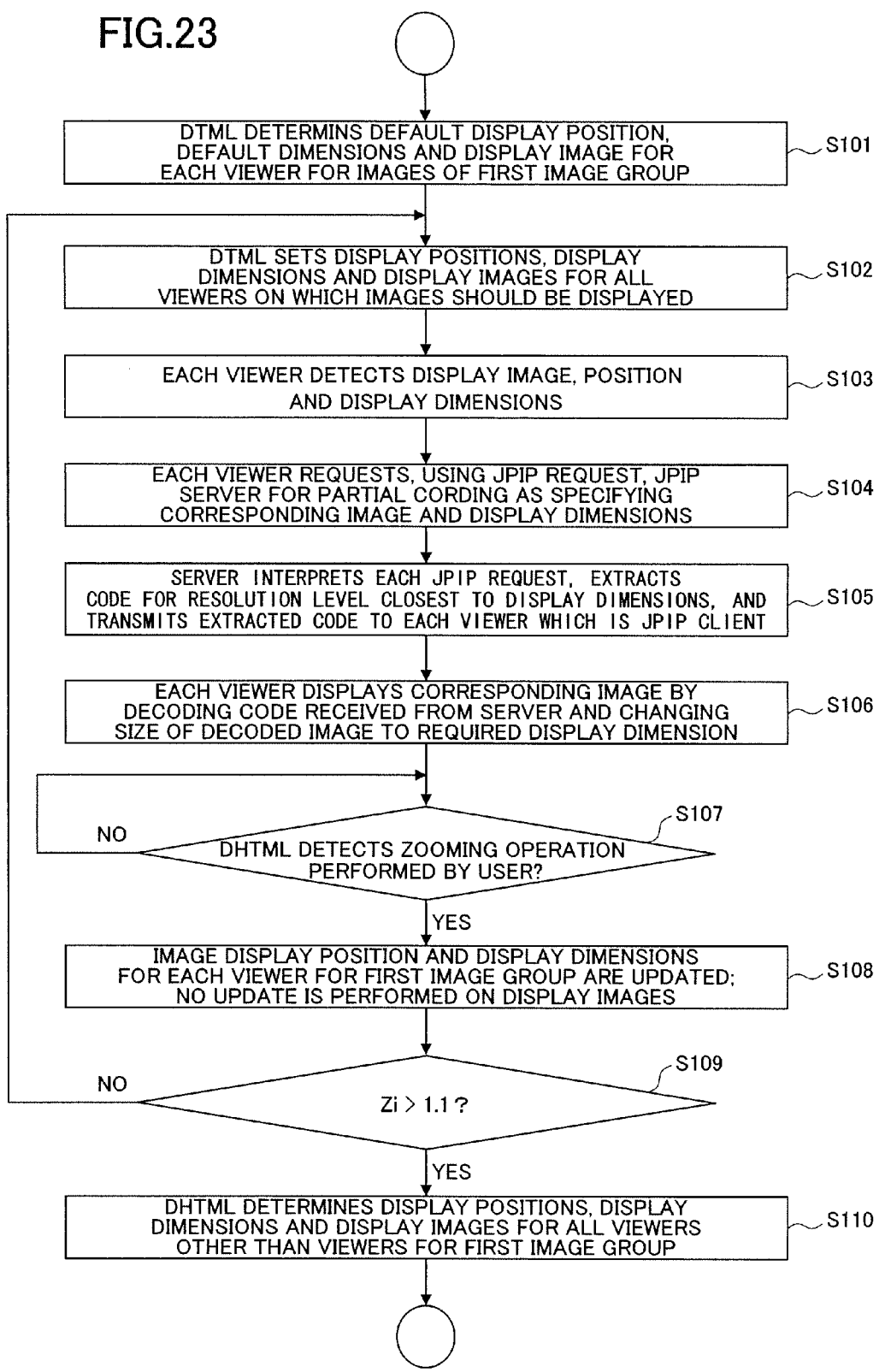

- S101: DTML DETERMINS DEFAULT DISPLAY POSITION, DEFAULT DIMENSIONS AND DISPLAY IMAGE FOR EACH VIEWER FOR IMAGES OF FIRST IMAGE GROUP
- S102: DTML SETS DISPLAY POSITIONS, DISPLAY DIMENSIONS AND DISPLAY IMAGES FOR ALL VIEWERS ON WHICH IMAGES SHOULD BE DISPLAYED
- S103: EACH VIEWER DETECTS DISPLAY IMAGE, POSITION AND DISPLAY DIMENSIONS
- S104: EACH VIEWER REQUESTS, USING JPIP REQUEST, JPIP SERVER FOR PARTIAL CORDING AS SPECIFYING CORRESPONDING IMAGE AND DISPLAY DIMENSIONS
- S105: SERVER INTERPRETS EACH JPIP REQUEST, EXTRACTS CODE FOR RESOLUTION LEVEL CLOSEST TO DISPLAY DIMENSIONS, AND TRANSMITS EXTRACTED CODE TO EACH VIEWER WHICH IS JPIP CLIENT
- S106: EACH VIEWER DISPLAYS CORRESPONDING IMAGE BY DECODING CODE RECEIVED FROM SERVER AND CHANGING SIZE OF DECODED IMAGE TO REQUIRED DISPLAY DIMENSION
- S107: DHTML DETECTS ZOOMING OPERATION PERFORMED BY USER?
- S108: IMAGE DISPLAY POSITION AND DISPLAY DIMENSIONS FOR EACH VIEWER FOR FIRST IMAGE GROUP ARE UPDATED; NO UPDATE IS PERFORMED ON DISPLAY IMAGES
- S109: $Z_i > 1.1$ ?
- S110: DHTML DETERMINES DISPLAY POSITIONS, DISPLAY DIMENSIONS AND DISPLAY IMAGES FOR ALL VIEWERS OTHER THAN VIEWERS FOR FIRST IMAGE GROUP

ZOOMING OPERATIONS AND MAGNIFICATION FOR GROUPS OF IMAGES

This application claim priority to and incorporates by reference the entire contents of Japanese Patent Application No. 2007-288555, filed in the Japan Patent Office on Nov. 6, 2007.

BACKGROUND OF THE INVENTION

1. Field of the Invention

Embodiments of the present invention relate to an image display apparatus, an image display method, an image display program and a recording medium.

2. Description of the Related Art

Conventionally, images are generally searched by keywords by specifying textual data preassocited with the images. However, in the case where there is no textual data associated with images or such associated textual data is invalid, it is common practice that thumbnails of images are displayed in a list format and images are visually searched by eye.

A common method used when there are a great number of images subject to such eye searches is to limit the number of images displayed on a monitor to 30 or so, for example, and view all images by scrolling both in a vertical and a horizontal direction (see FIG. 1). FIG. 1 shows a first example of a conventional screen display for image search. This technique has an advantage of providing a high level of visibility since each image is displayed in a sufficiently large size; however, also has a disadvantage of not being able to provide a view on all images at one time.

There is another technique in which the display dimensions per image are reduced, thereby displaying all images at one time, as shown in FIG. 2. FIG. 2 shows a second example of a conventional screen display for image search. This technique provides a macroscopic, simultaneous overview of all images, and particularly if the images are classified based on visual characteristics, it is easy to find a target image. Specifically, a target image can be found, for example, by spotting certain images according to image characteristics and the like while having a macroscopic overview of all the images and then zooming in around the images by a zooming operation (here, a case is considered where multiple images are simultaneously zoomed in). According to this technique, however, there is a disadvantage that the display dimensions of each image become smaller as the total number of images on the screen increases. If the number of images on the screen further increases, the images may overlap one another.

Thus, the visibility of each image and the macroscopic visibility of all images counteract each other; however, in the case where the images are classified based on visible characteristics, for example, it is possible to achieve a good balance between these two.

For example, consider a case where images are classified into some groups, as shown in FIG. 3 (there are various possible group classifications for different purposes, such as classification based on similarity of visual characteristics of images, classification based on closeness of dates on which image files were created, and classification according to creators of image files). FIG. 3 shows a third example of a conventional screen display for image search.

This technique makes it possible, if there are a large number of images, to display only a representative image for each group, as shown in FIG. 4, or to display only a foreground image (i.e. an image on which no other images are superimposed) for each group. FIG. 4 shows a fourth example of a conventional screen display for image search. This technique allows a good balance between the group-based macroscopic visibility and the visibility of the representative images. Therefore, with the technique, it is possible to, while having a macroscopic overview of all images on the basis of representative images, spot a certain image according to image characteristics or the like.

Conventional screen display techniques for image search have been described above, and Japanese Laid-open Patent Application Publication No. 2004-178384, for example, discloses a technology pertaining to a content search method and the like which allow searching for a desired content while providing a comprehensive overview of a large number of content without narrowing the macroscopic visibility on the display screen.

Japanese Laid-open Patent Application Publication No. 2004-258838 discloses a technology pertaining to an information search method that allows easily searching for target information in a short period of time. Japanese Patent Publication No. 3614235 discloses a technology pertaining to an information seeking method and the like for efficiently searching a large amount of information.

In the case of adopting a screen display configuration as shown in FIG. 2 or FIG. 4—that is, a screen display configuration that allows the user to spot a certain image according to image characteristics and the like while having a macroscopic overview of all images and then to zoom in around the spotted image by a zooming operation (here, a case is considered where multiple images are simultaneously zoomed in), blank spaces (i.e. areas with no images displayed) are formed between the representative images. Conventionally, such non-display areas due to an image zooming operation are not effectively used, and therefore further improvement in the visibility of a single image and the macroscopic visibility of multiple images cannot be achieved.

SUMMARY OF THE INVENTION

An image display apparatus, image display method, image display program and recording medium are described. In one embodiment, the image display apparatus for displaying a plurality of images on a single screen, comprises a magnification unit to, in response to a zooming operation on the screen, magnify distances between centroids of first group images included in the plurality of images and magnify the first group images; and a display control unit to display in a space of the magnified distances one or more images different from the plurality of images, wherein a magnification rate of the distances between the centroids has a nonlinear relationship to a magnification rate of the first group images, and within an extent of the nonlinear relationship, the magnification rate of the distances between the centroids has a predetermined range in which the magnification rate of the first group images is larger than the magnification rate of the distances between the centroids.

BRIEF DESCRIPTION OF THE DRAWINGS

FIG. 7 shows an example of a relationship between decomposition levels and resolution levels;

FIG. 8 shows an example of layers and packets;

FIG. 9 shows progression orders;

FIG. 10 is a schematic diagram showing a resolution-level progressive coding;

FIG. 11 shows an example of a packet arrangement according to an RLCP progression order;

FIG. 12 shows details of an SOT marker segment;

FIG. 13 shows an example of tile-parts created by dividing an RLCP progression order code at R boundaries;

FIG. 14 shows details of a COD marker segment of JPEG2000 used in a present embodiment;

FIG. 23 shows a first example of an image display process according to the present embodiment.

DETAILED DESCRIPTION OF THE PREFERRED EMBODIMENTS

An image display apparatus, an image display method, an image display program and a recording medium to achieve further improvement in the visibility of a single image and the macroscopic visibility of multiple images are disclosed.

In order to achieve the above-mentioned purpose, one embodiment of the present invention comprises an image display apparatus for displaying multiple images on a single screen. The image display apparatus includes a magnification unit to, in response to a zooming operation on the screen, magnify distances between centroids of first group images included in the multiple images and magnify the first group images; and a display control unit to display in a space of the magnified distances one or more images different from the multiple images. A magnification rate of the distances between the centroids has a nonlinear relationship to a magnification rate of the first group images, and within an extent of the nonlinear relationship, the magnification rate of the distances between the centroids has a predetermined range in which the magnification rate of the first group images is larger than the magnification rate of the distances between the centroids.

Next is described a preferred embodiment of the present invention with reference to the drawings.

Embodiment

The following describes an embodiment of the present invention. In the present embodiment, compression-coded images stored in an image display apparatus (a server apparatus) on a network are transmitted to a client apparatus, on which the images are decompressed and then displayed.

When the images are displayed on the client apparatus, an image zooming operation is carried out together with image grouping. In order to improve the response speed of the zooming operation, the present embodiment adopts image data in JPEG2000 format, and adopts a transfer protocol called JPIP (JPEG2000 Interactive Protocol), which allows transfer of partial images, for communication between the image display apparatus and the client apparatus. The following explains JPEG2000 and JPIP. It should be noted, however, that the applicable scope of the present invention is not limited to JPEG2000 and JPIP, and the present invention may employ image data in a different format and a different communication protocol.

JPEG2000

Figure 1:
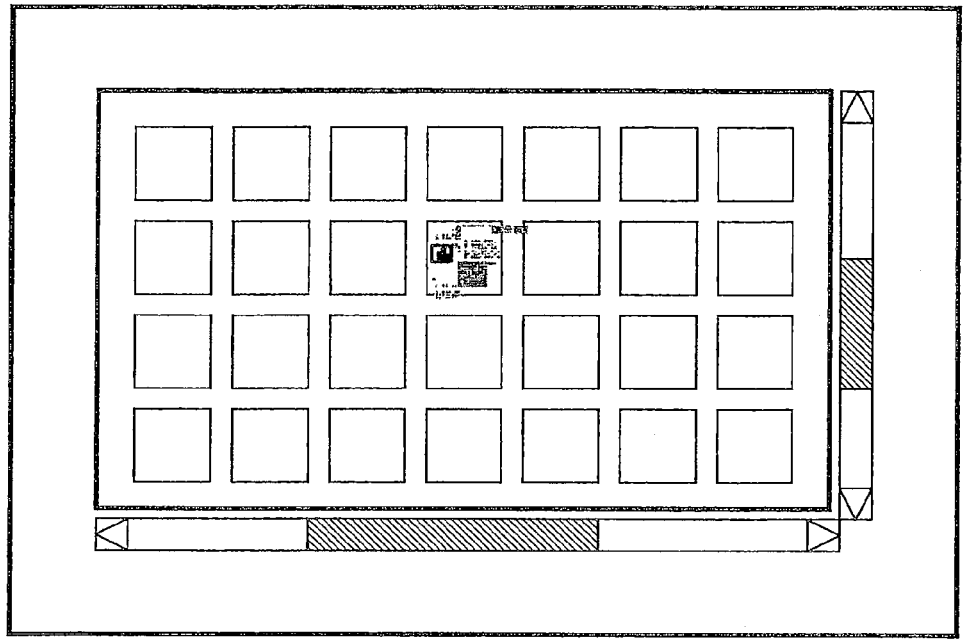
FIG. 1 shows a first example of a conventional screen display for image search.
Figure 2:
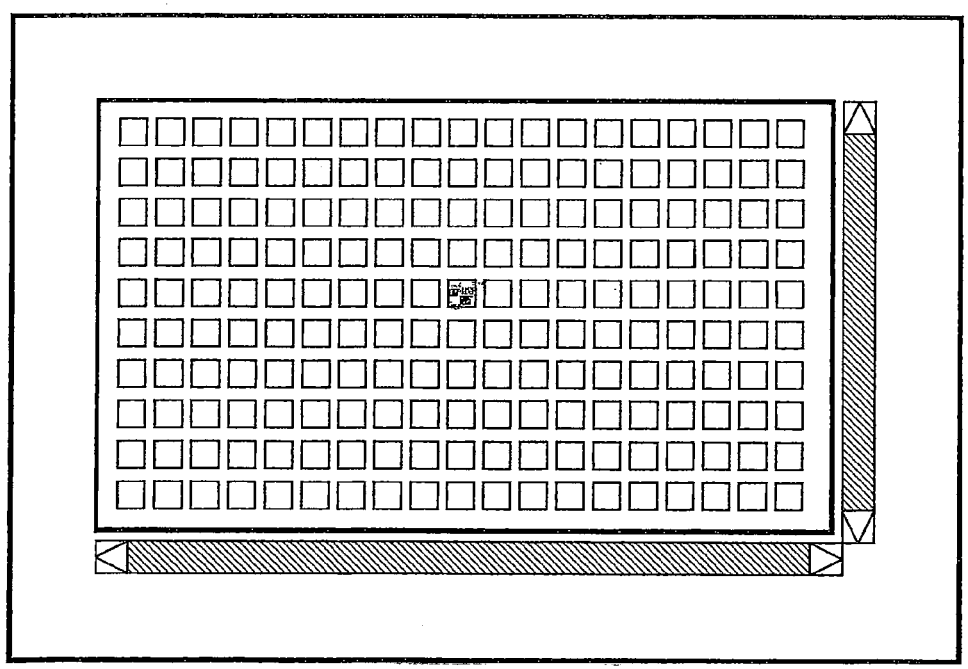
FIG. 2 shows a second example of a conventional screen display for image search.
Figure 3:
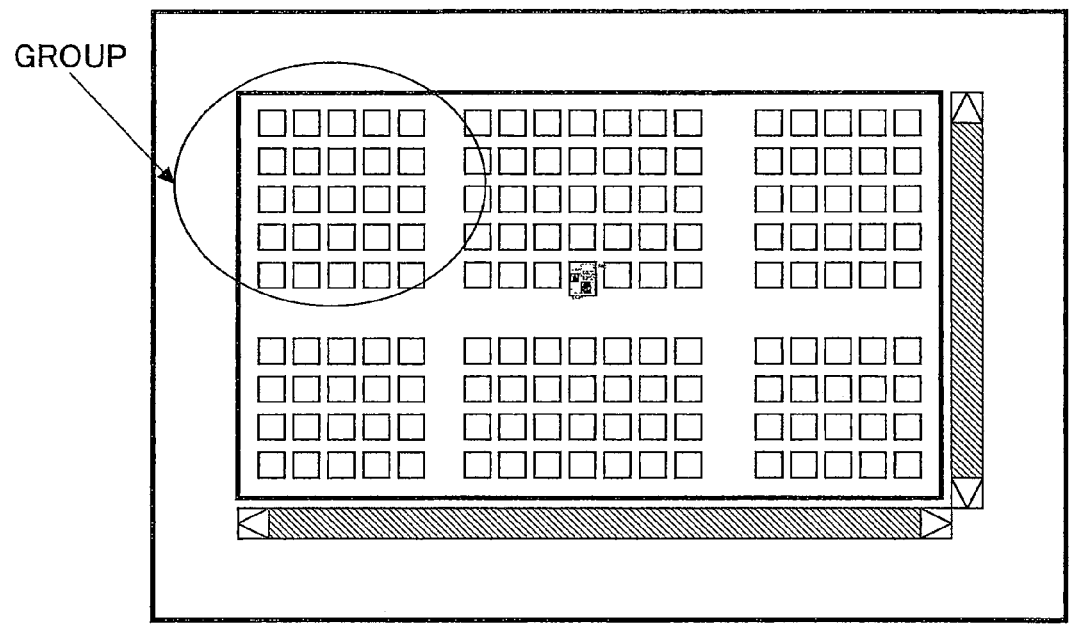
FIG. 3 shows a third example of a conventional screen display for image search.
Figure 4:
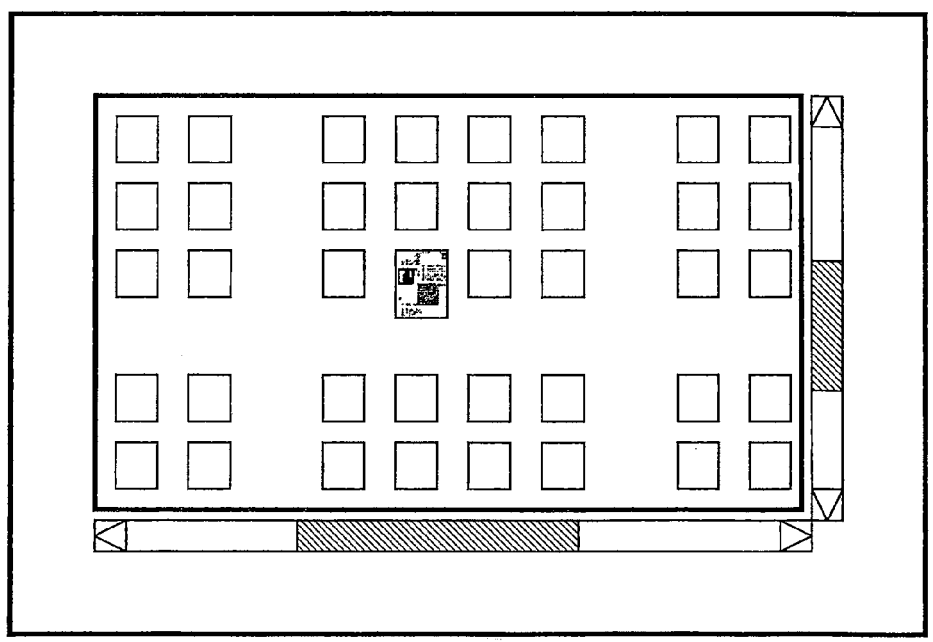
FIG. 4 shows a fourth example of a conventional screen display for image search.
Figure 5:
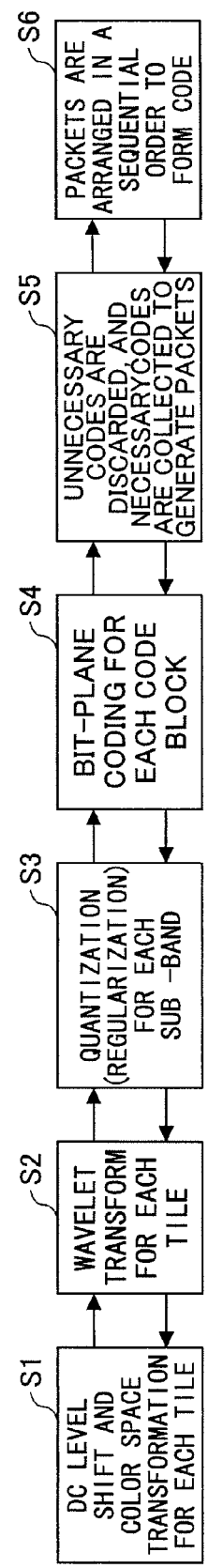
FIG. 5 shows an example of a flow of a JPEG2000 encoding process.

FIG. 5 shows an example of a flow of a JPEG2000 encoding process. The JPEG2000 encoding process is generally carried out according to the flow shown in FIG. 5. The following gives a description of the flow of FIG. 5.

First, at Step S1, a DC level shift operation and a color space transformation are performed for each tile (S1). In this step, an image to be encoded is divided into one or more rectangular tiles, and color space conversion is carried out for each tile to generate components, such as brightness and color difference.

Figure 6:
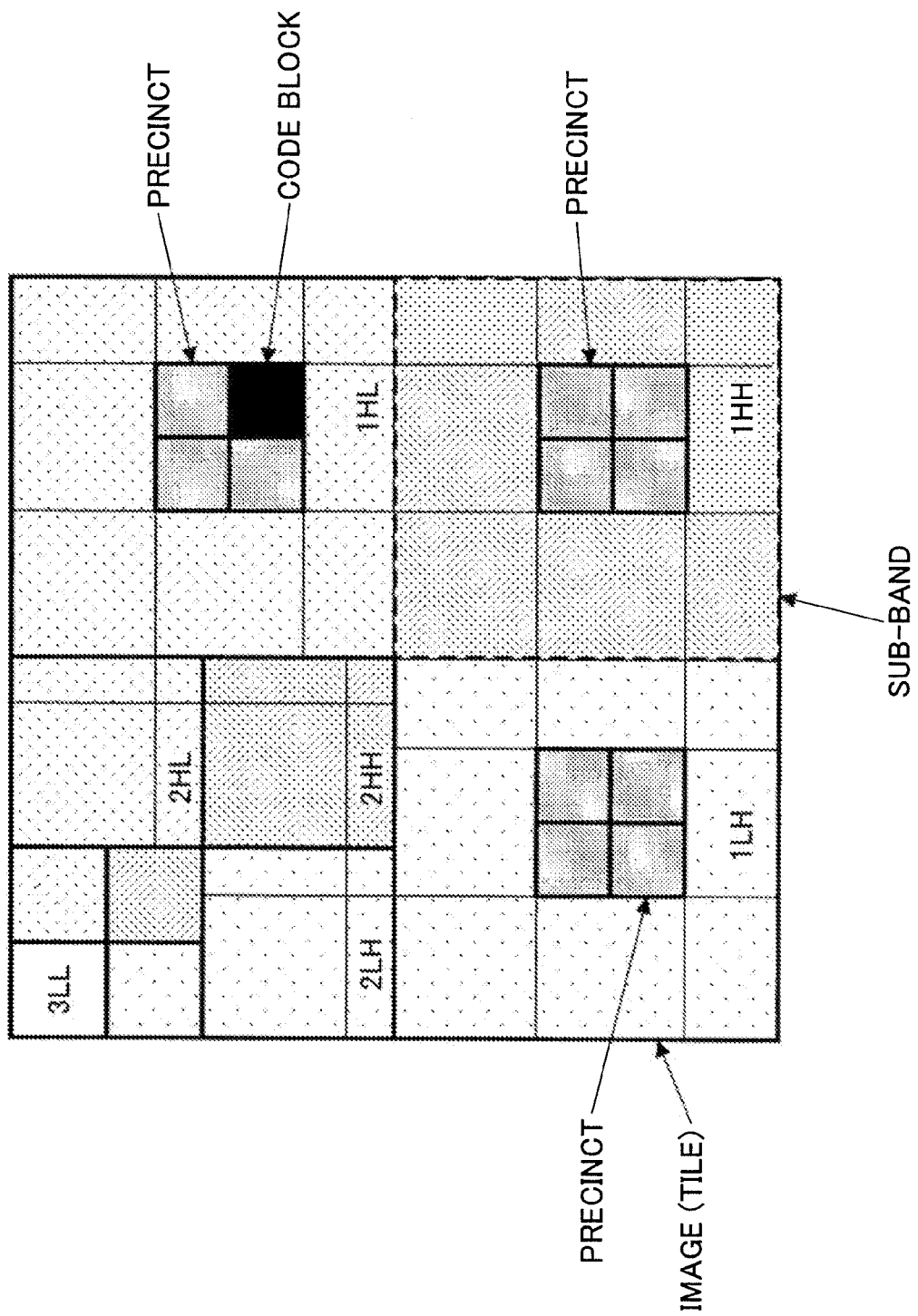
FIG. 6 shows an example of a relationship among concepts of an image, tiles, sub-bands, precincts and code blocks.

At Step S2, a wavelet transform is performed for each tile (S2). In this step, the wavelet transform divides each of the components (referred to herein as "tile components") converted in Step S1 into four sub-bands called LL, HL, LH and HH for short. The wavelet transform (decomposition) is repeatedly and recursively applied to the LL sub-band, which eventually generates one LL sub-band and multiple HL, LH and HH sub-bands (see FIG. 6). FIG. 6 shows a relationship among concepts of an image, tiles, sub-bands, precincts and code blocks.

At Step S3, quantization (regularization) is carried out for each sub-band (S3). In this step, the quantization of the sub-bands is achieved by dividing each sub-band generated in Step S2 into rectangular regions referred to as "precincts". Three precincts located at the same region of each of the sub-bands HL, LH and HH generated in Step S2 are handled as a single precinct partition. On the other hand, a precinct obtained by dividing the LL sub-band is handled as a single precinct partition. Each precinct serves to indicate a position in the image. A precinct may have the same size as the sub-band. The precinct is further divided into rectangular regions referred to as "code blocks" (see FIG. 6). That is to say, there is a physical size relationship of image≧tile>sub-band≧precinct≧code block. A relationship between resolution levels and the number of times that the wavelet transform is applied to an image (decomposition levels) is shown in FIG. 7. FIG. 7 shows an example of the relationship between the decomposition levels and resolution levels.

Referring back to FIG. 5, at Step S4, each code block is bit-plane coded (S4). In this step, the bit-plane coding (entropy coding of coefficients) is performed in bit-plane order with respect to each of the code blocks divided in Step S3. Further details are provided below.

An entity called a "packet" is obtained by attaching a packet header to a collection of parts of bit-plane codes (the "parts" may be empty in this case) extracted from each code block (for example, a collection of codes of the first three bit-planes from the MSB-plane (Most Significant Bit-plane)) included in the precincts generated in Step S3. The packet header includes information pertaining to codes included in the packet, and each packet may be independently handled. In a sense, the packet is a unit of coding.

A portion of all codes of the entire image (for example, codes of the wavelet coefficients of the entire image from the MSB bit-plane through the third level bit-plane) is obtained by collecting packets of all precincts (=all code blocks=all sub-bands). This obtained portion is referred to as a "layer". Since the layer is a portion of codes of the bit-planes of the entire image, image quality becomes higher as the number of decoded layers increases. That is, the layer is a unit of image quality.

Figure 8:
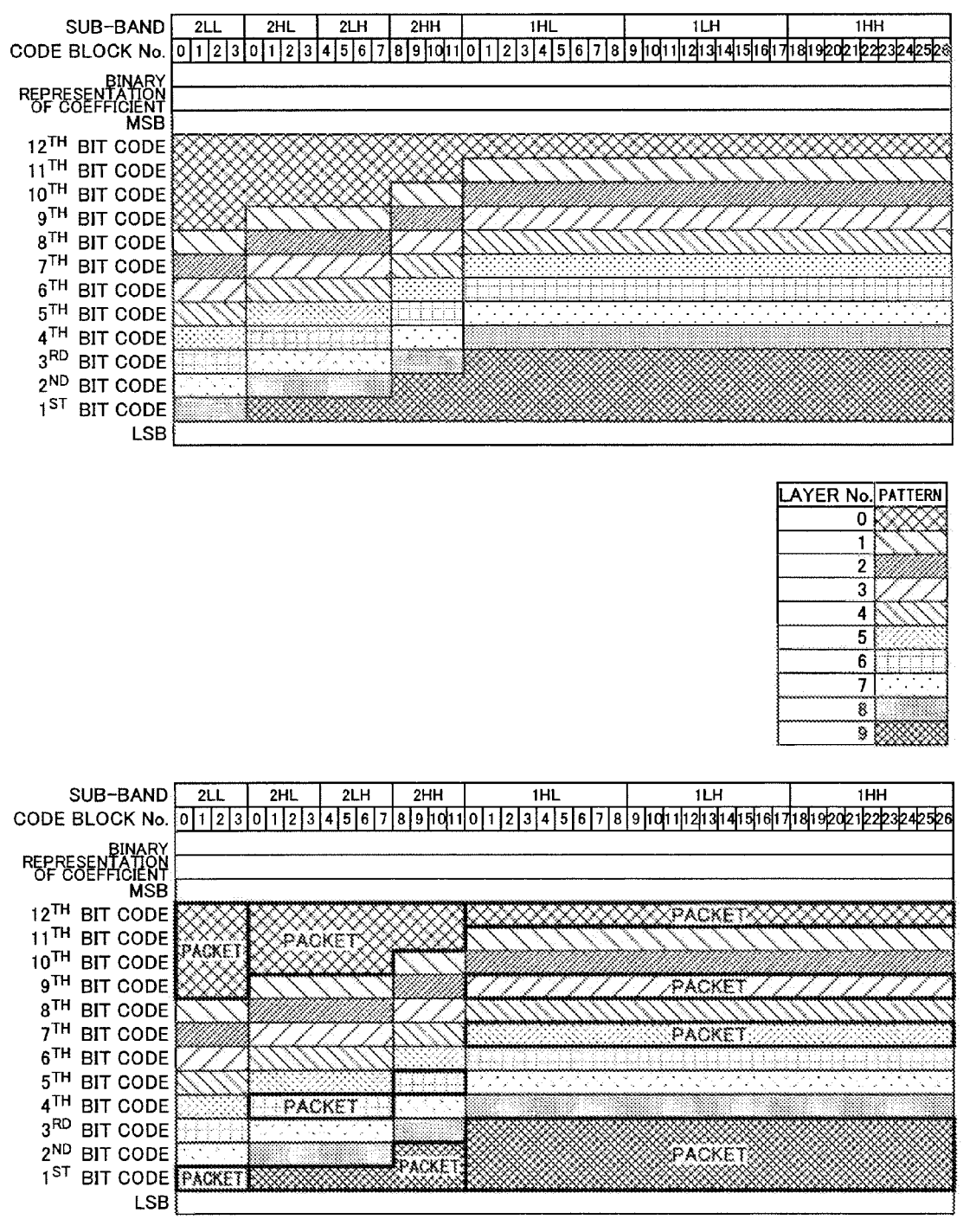

The codes of all bit-planes of the entire image can be obtained by collecting all the layers. FIG. 8 shows an example of layers and packets. The example of FIG. 8 illustrates layers and packets included in the layers in the case where "decomposition level=2" and "precinct size=sub-band size". Since a packet is formed with respect to a precinct, packets span the HL, LH and HH sub-bands of the same decomposition level when "precinct size=sub-band size". In FIG. 8, some packets are indicated by thick-lined boxes.

A final code is formed by arranging the generated packets according to the manner where the packets and the layers are divided. Herewith, each packet has four attributes (hereinafter referred to simply as "progression attributes") of a component of the packet (denoted as "C"); a resolution level ("R"); a precinct (position) of the packet ("P"); and a layer ("L"). A packet header is provided at the beginning of each packet, and the packet header is followed by MQ codes (packet data). The arrangement of the packets means a hierarchical arrangement of the packet headers and packet data in accordance with a defined order of the progression attributes. The order of the progression attributes determining the packet arrangement is referred to as a progression order, and five different types of progression orders shown in FIG. 9 are defined. FIG. 9 shows the five progression orders.

The following describes the manner in which an encoder arranges packets according to a progression order and the manner in which a decoder interprets attributes of packets according to a progression order.

The following is an excerpt from ITU-T Rec. T.800 | ISO/IEC 15444-1, which describes the case where the progression order is LRCP.

B.12.1.1 Layer-Resolution Level-Component-Position Progression

Layer-resolution level-component-position progression is defined as the interleaving of the packets in the following order:

for each l=0, . . . , L−1
    for each r=0, . . . , $N_{max}$
        for each i=0, . . . , Csiz−1
            for each k=0, . . . , numprecincts−1
                packet for component i, resolution level r, layer l, and precinct k.

Here, L is the number of layers and $N_{max}$ is the maximum number of decomposition levels, $N_L$, used in any component of the tile. A progression of this type might be useful when low sample accuracy is most desirable, but information is needed for all components.

That is, the packet arrangement (at the time of encoding) and packet attribute interpretation (at the time of decoding) are performed in the following order:

```
for (layer){
    for (resolution){
        for (component){
            for (precinct){
                during encoding: packet arrangement
                during decoding: packet attribute interpretation
            }
        }
    }
}
```

Each packet has a packet header, as described above, and the header is written with data indicating (1) whether the content of the packet is empty;
(2) which code blocks are included in the packet;
(3) the number of zero bit planes of each code block included in the packet;
(4) the number of coding passes of the codes of each code block included in the packet (the number of bit planes); and
(5) the code length of each code block included in the packet.

However, a packet header does not contain any data indicating a layer number, a resolution level and the like. Therefore, in order to determine the layer and the resolution level of each packet at the time of decoding, it is necessary to generate a for-loop (such as the one shown above) based on a progression order written in, for example, a COD marker segment in the main header, then identify a boundary of the packet according to the sum of the code length of each code block included in the packet, and determine the part of the for-loop at which the packet is handled. Accordingly, by simply reading the code length written in the packet header, the next packet can be detected—that is, a given packet can be accessed—without decoding entropy codes.

FIG. 10 is a schematic diagram showing a resolution-level progressive coding. FIG. 10 shows the concept of a resolution-level progressive codes in which the resolution-level attribute (R) is located at the outermost part of the for-loop as in the RLCP progression. FIG. 11 shows an example of the packet arrangement according to an RLCP progression order. The example of FIG. 11 shows an arrangement of 36 packets according to an RLCP progression order in a case where the precinct size is 32×32.

The code for each tile can be further divided into multiple parts at the boundaries of packets. These divided parts are referred to as "tile-parts". Each tile-part includes a header starting from an SOP (Start Of Tile-part) marker segment and ending at an SOD (Start Of Date) marker. This header is referred to as a "tile-part header". FIG. 12 shows details of an SOT marker segment. FIG. 12(B) illustrates details of the SOT marker segment (a part including a marker and parameters pertaining to the marker is referred to as "marker segment") in the tile-part header. The length of a particular tile-part can be determined by reading the content of a parameter "Psot" included in the SOT marker segment. Accordingly, by reading the SOT marker segment, access can be made to codes on a tile-part by tile-part basis without decoding the packet header. It should be noted that FIG. 10 shows the case where the number of tile-parts is one.

JPIP

As has been described above, the JPEG2000 code allows access on a packet-by-packet basis, or more simply on a tile-part by tile-part basis. This means that only a necessary code is extracted from an original code to create a new code.

This also means that only partial code can be decoded from the original code when needed. For example, in the case of displaying on a client apparatus a large image stored in an image display apparatus (server apparatus), the client apparatus is able to receive from the image display apparatus and decode only a code for required image quality, a code for required resolution, a code for a desired part of the image, or a code for a desired component. A protocol for receiving only a necessary partial code of JPEG2000 code stored in the image display apparatus is called JPIP.

In the JPIP protocol, it is proposed that the client apparatus specifies to the image display apparatus a desired resolution level of a particular image and an actual window size for depicting the image. When receiving such specifications, the image display apparatus transmits packets of precincts covering a corresponding area of the image having a specified resolution, or more simply transmits tile-parts covering the corresponding area. The present embodiment uses a JPIP system (referred to as "JPT system") for transmitting tile-parts.

Such a JPT system extracts tile-parts covering a corresponding part from tile-parts of the entire image in the following manner. In this case, it is a premise that the image display apparatus knows how tile-parts of the code that the image display apparatus itself manages are divided.

For example, in the case where packets of the RLCP progression order code corresponding to one tile and two layers as shown in FIG. 11 are divided at the boundaries of all resolution levels, three tile-parts as shown in FIG. 13 can be obtained. FIG. 13 shows an example of tile-parts created by dividing the RLCP progression order code at R boundaries.

Assume that the image display apparatus receives from the client apparatus a request for "displaying a resolution portion corresponding to 25×25 pixels in a 20×20 window size". The "resolution portion corresponding to 25×25 pixels" indicates a portion where the resolution level is 0, and the "20×20 window size" indicates 20×20 pixels among pixels having a resolution level of 0.

The image display apparatus extracts tile-parts covering the resolution level 0 from the code that the image display apparatus itself manages, and transmits the extracted tile-parts to the client apparatus together with main header information of the code. Since each tile-part has an SOT marker segment at its beginning and the length of the tile-part can be understood, the boundaries of the tile-parts are always determinable. It is clearly seen from FIGS. 13-15 that tile-parts to be transmitted (i.e. from $x^{th}$ tile-part to $y^{th}$ tile-part) are determined by two parameters—the progression order of the code and the method of dividing the code into tile-parts. The progression order can be read from the code itself since it is written in a COD marker segment of the main header or tile-part header. The dividing of the code into tile-parts is well-known in the art.

FIG. 14 shows details of a COD marker segment of JPEG2000 used in the present embodiment. A default progression order of FIG. 14(C) is written in SGcod (see FIG. 14(B)) of a COD marker segment in the main header, and is also written in a COD marker segment of the tile-part header when needed.

This completes the description of the JPEG2000 and JPIP.

Structural Example of Image Display Apparatus

Figure 15:
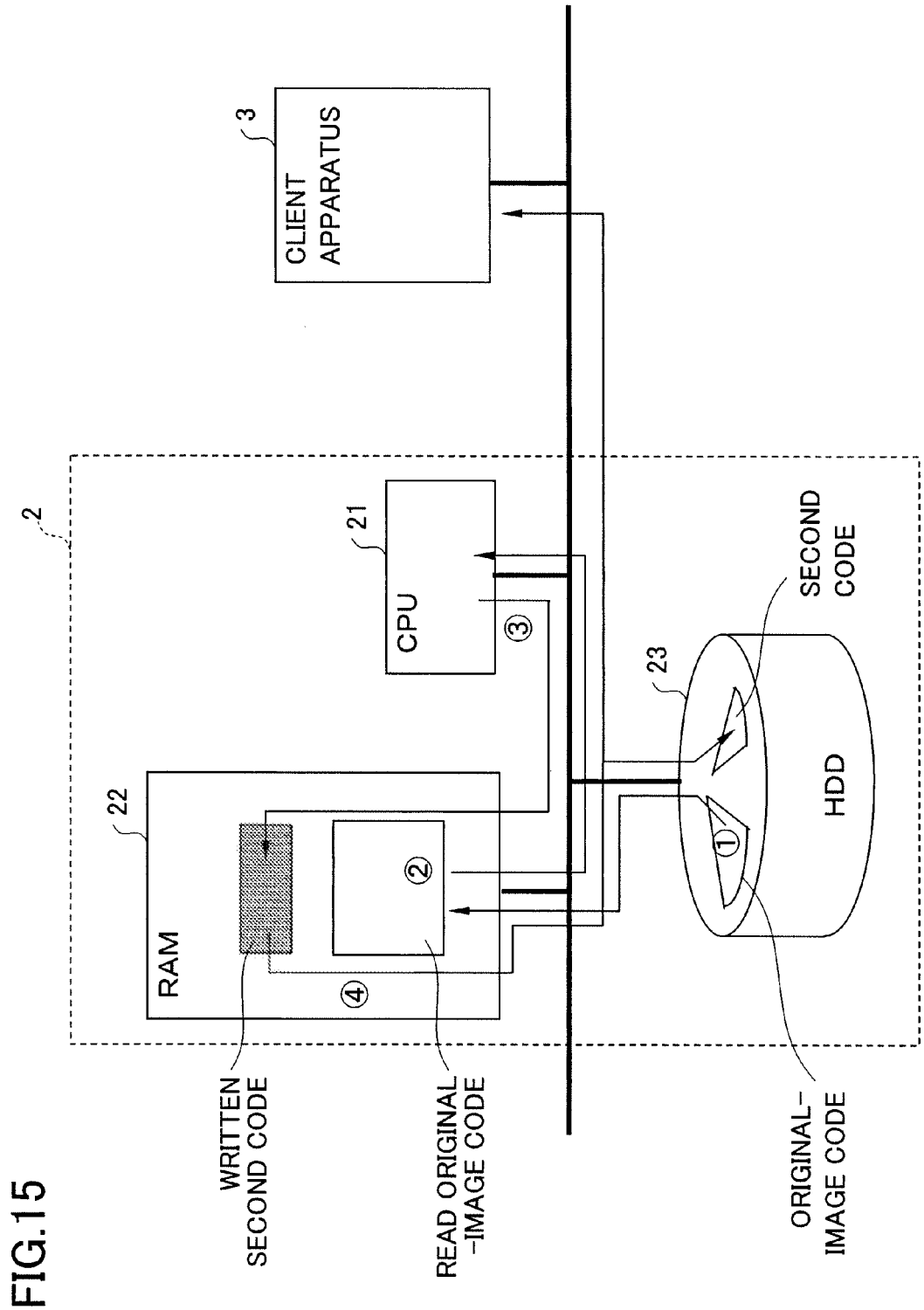
FIG. 15 shows a structural example of an image display system of the present embodiment.

Next describes the image display apparatus according to the present embodiment. FIG. 15 shows a structural example of an image display system of the present embodiment.

In FIG. 15, an image display system 1 is a client server system including an image display apparatus (a server apparatus) 2 and a client apparatus 3. The image display apparatus 2 has, for example, a CPU (Central Processing Unit) 21, a RAM (Random Access Memory) 22, and an HDD 23 connected via a data bus 4. Note that the HDD 23 may be an apparatus externally connected to the image display apparatus 2. Also the client apparatus 3, which is a general computer apparatus having a CPU, RAM and the like, is connected to the image display apparatus 2 via the data bus 4.

In the image display system 1 having the above-mentioned structure, when the image display apparatus 2 receives from the client apparatus 3 specifications for an image code, an image resolution level (fsize), a display window and the like, the following processes are performed in the image display apparatus 2: (1) a code of original image stored in the HDD 23 is read to the RAM 22 according to an instruction from the CPU 21; (2) the CPU 21 reads the code in the RAM 22; (3) the CPU 21 extracts a desired code from the original image; and (4) the extracted code is transmitted to the client apparatus 3 (or the HDD 23) according to an instruction of the CPU 21. Note that in the present embodiment, multiple images are displayed, and therefore the processes (1) through (4) are carried out as many times as the number of images to be displayed.

Note that the description herein is given of the embodiment in which the server apparatus 2 is an image display apparatus; however, the present invention is not limited to this case. The client apparatus 3 that actually displays images may be an embodiment of the image display apparatus of the present invention, or an image display system implementing functions of both the server apparatus 2 and client apparatus 3 may be an embodiment of the broadly-defined image display apparatus of the present invention.

Functional Example of Image Display Apparatus

Figure 16:
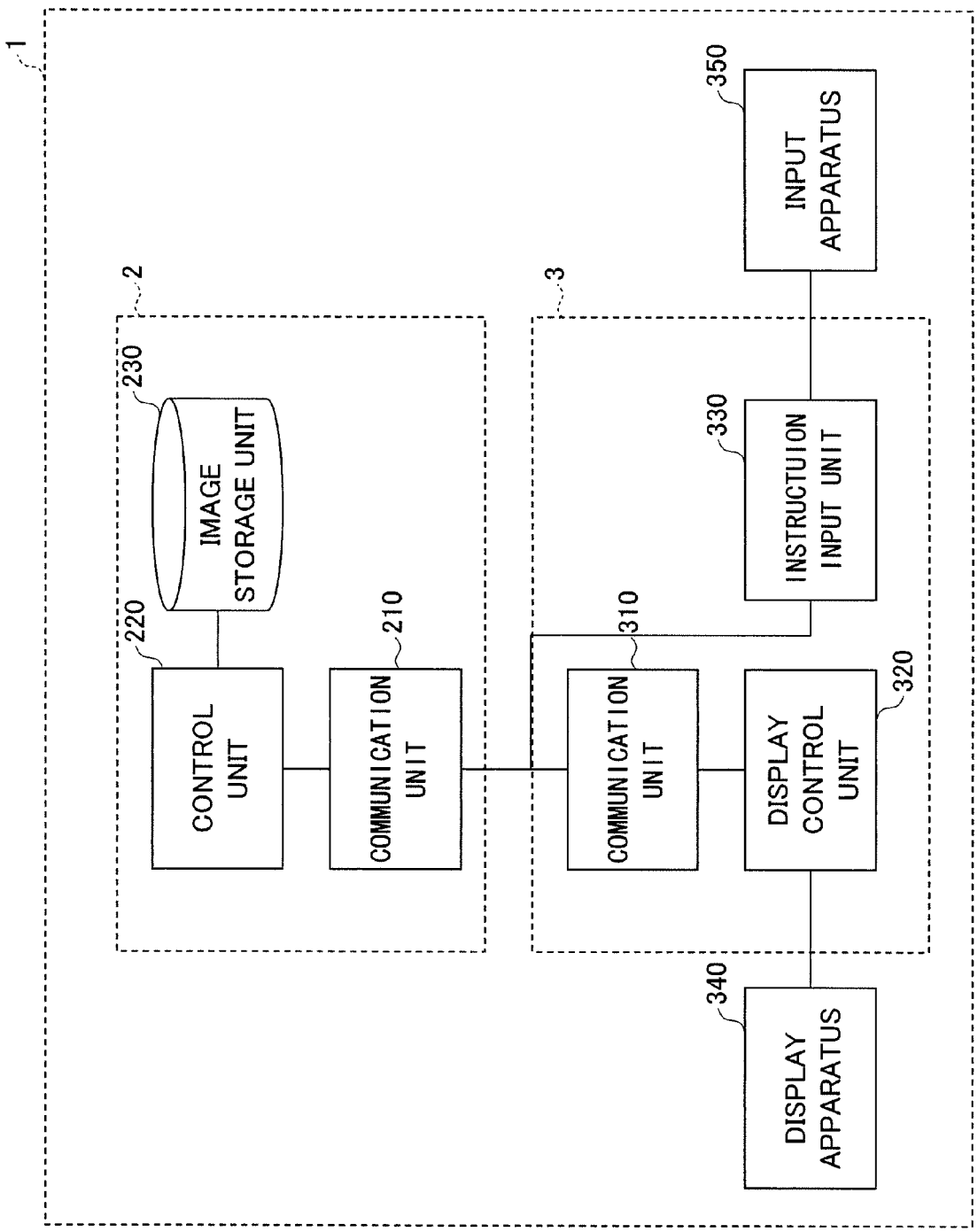
FIG. 16 shows a functional example of an image display system according to the present embodiment.

FIG. 16 shows a functional example of the image display system according to the present embodiment.

In FIG. 16, the image display apparatus 2 includes a communication unit 210, a control unit 220 and an image storage unit 230, and the client apparatus 3 includes a communication unit 310, a display control unit 320, an instruction input unit 330 and the like.

The communication unit 210 performs various communications with the client apparatus 3. The "various communications" here include a process for receiving specifications for an image code, an image resolution level (fsize) and a display window. Based on the specifications received by the communication unit 210, the control unit 220 obtains corresponding information—such as image code information—of an image stored in the image storage unit 230. The obtained information is transmitted to the client apparatus 3 via the communication unit 210. The image storage unit 230 stores therein images, or more specifically image data in JPEG2000 format described above.

The communication unit 310 performs various communications with the image display apparatus 2. The "various communications" here include a process for receiving information, such as image code information, from the image display apparatus 2.

The display control unit 320 performs various display-related controls, such as causing a display apparatus 340 (e.g., a display monitor) to display images. The display control unit 320 also has a function as centroid-to-centroid distance magnification means. This function is used when, among multiple images displayed on a single screen, images of a first image group are to be displayed according to a zoom-in instruction or a centering instruction input by the instruction input unit 330 to be described below. The function allows the images of the first image group to be displayed in such a manner that distances between centroids (i.e. centroid-to-centroid distance) of these images are magnified.

The instruction input unit 330 inputs various instructions—such as input regarding specifications for an image code, an image resolution level (fsize) and a display window—made on an input apparatus 350 (e.g. a mouse).

According to the above-described functional structure, in the image display system 1 of the present embodiment, compression-coded images stored in the image display apparatus 2 on the network are transmitted to the client apparatus 3, on which the images are decompressed and then displayed.

Coordinate System for Image Display

Figure 17:
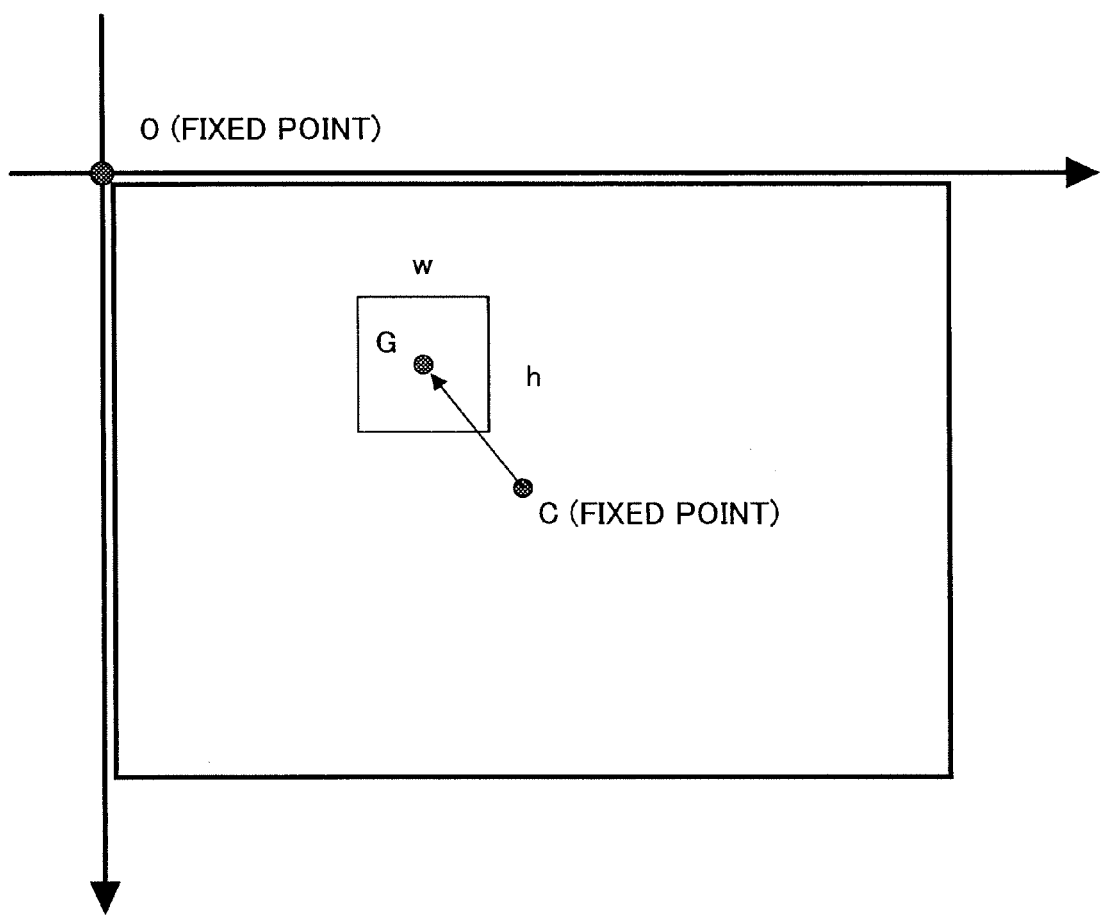
FIG. 17 illustrates a coordinate system used for image display in the present embodiment.

FIG. 17 illustrates a coordinate system used for image display in the present embodiment. The coordinate system for image display is described here with an example of the display apparatus 340 of FIG. 16 being a display monitor having a resolution level of 1280×1024 dots.

FIG. 17 shows a coordinate system ranging from the origin (0, 0) at the upper left to the point (1280, 1024) at the lower right. Each image displayed on the display apparatus 340 has centroid coordinates G and display dimensions of w and h in the horizontal and the vertical directions, respectively. Note that, in FIG. 17, Point 0 (0, 0) and Point C (640, 512) are provided as fixed points.

Example of Initial Image Display

Figure 18:
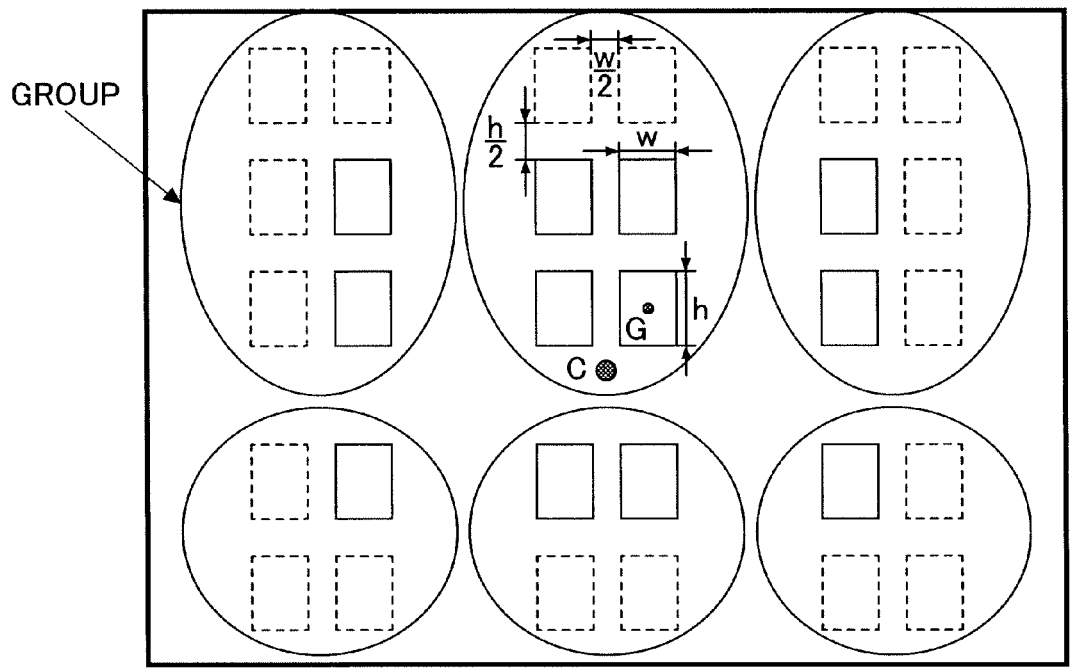
FIG. 18 shows an example of an initial image display.

FIG. 18 shows an example of an initial image display. A screen shown in FIG. 18 is displayed on the display apparatus 340 by the display control unit 320 of FIG. 16.

For each image shown in FIG. 18, the initial centroid coordinates G and horizontal and vertical dimensions w and h are defined, as described above. Note here that, in the present example of the initial image display, all images of FIG. 18 have the same horizontal and vertical dimensions w and h. Also in FIG. 18, the images are images of the first image group, which are representative images preliminarily selected by the user, and these images are divided into multiple groups (in this example, six groups).

In FIG. 18 showing the initial image display, the horizontal and vertical dimensions of a blank space between two images of the same group are set to w/2 and h/2, respectively (a larger blank space is provided between the groups).

Figure 20:
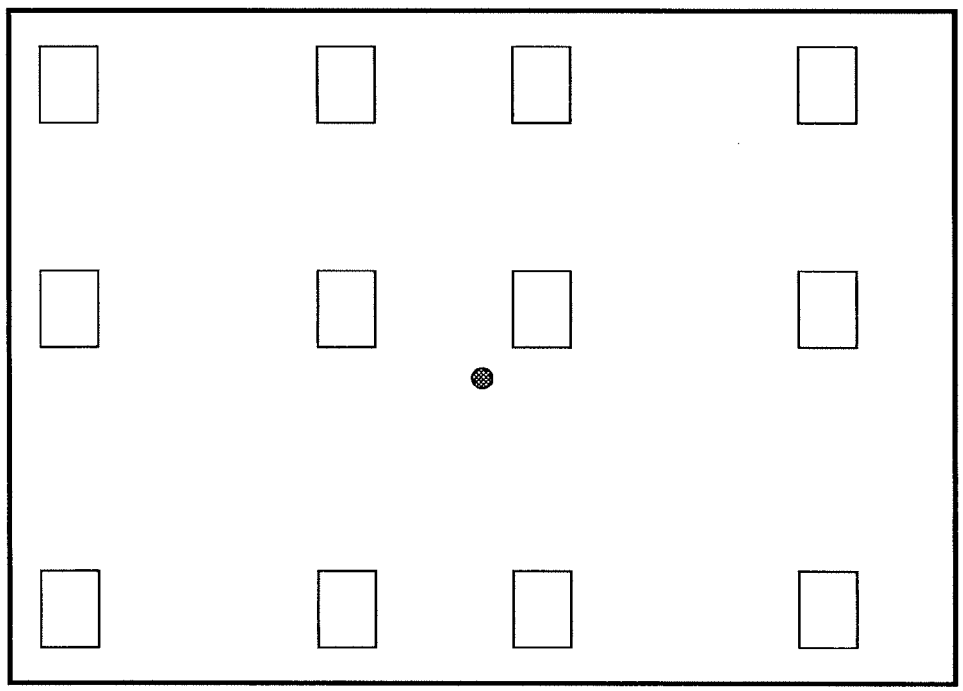
FIG. 20 shows an example of a display screen after a zooming operation.

In FIG. 18, dotted-line rectangles also represent actual images; however, in FIG. 20 (to be described below in detail), these dotted-line images are positioned outside of the display area.

Zooming Operation

Next operations are described for displaying magnified and reduced images according to zooming operations made, for example, on the input apparatus 350 (e.g. a mouse) of FIG. 16 during the time when the images of the initial image display are displayed on the display apparatus 340, as shown in FIG. 18.

Assume that a given image in FIG. 18 has initial centroid coordinates G0, an initial horizontal dimension w0 and an initial vertical dimension h0, and that a centroid-to-centroid distance magnification (rate) and an image zoom magnification (rate) according to a zooming operation are Zm and Zi, respectively. In this case, centroid coordinates G1 and a horizontal and a vertical dimension w1 and h1 of each image can be expressed by the following equations (1), (2) and (3), respectively. It should be noted that, in the present example of the image display, all zooming operations are performed with the point C at the center.

$$\overrightarrow{OG1} = \overrightarrow{OC} = Zm \cdot \overrightarrow{CG0} \quad \text{Equation (1)}$$

$$w1 = Z1 \cdot wO \quad \text{Equation (2)}$$

$$h1 = Z1 \cdot hO \quad \text{Equation (3)}$$

Figure 19:
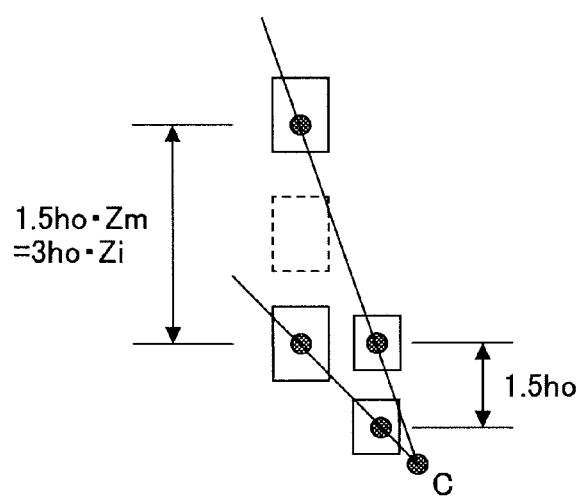
FIG. 19 illustrates magnifications of a blank space and image dimensions according to a zooming operation.

FIG. 19 illustrates magnifications of a centroid-to-centroid distance and image dimensions according to a zooming operation. As shown in FIG. 19, a vertical-direction distance between centroids (centroid-to-centroid distance) of two images is 1.5h0 in the initial image display. Assume here that, with the enlargement at the centroid-to-centroid distance magnification Zm, the centroids of these two images are shifted and the centroid-to-centroid distance increases by Zm-fold, and the horizontal and vertical dimensions of each image are enlarged at the image zoom magnification Zi. Then, further assume that exactly one image enlarged at the image zoom magnification Zi together with its expanded blank space fits in the extended centroid-to-centroid distance. In this case, the following relationship is established between Zm and Zi:

$$1.5h0 \cdot Zm = 3 \cdot h0 \cdot Zi.$$

Figure 21:
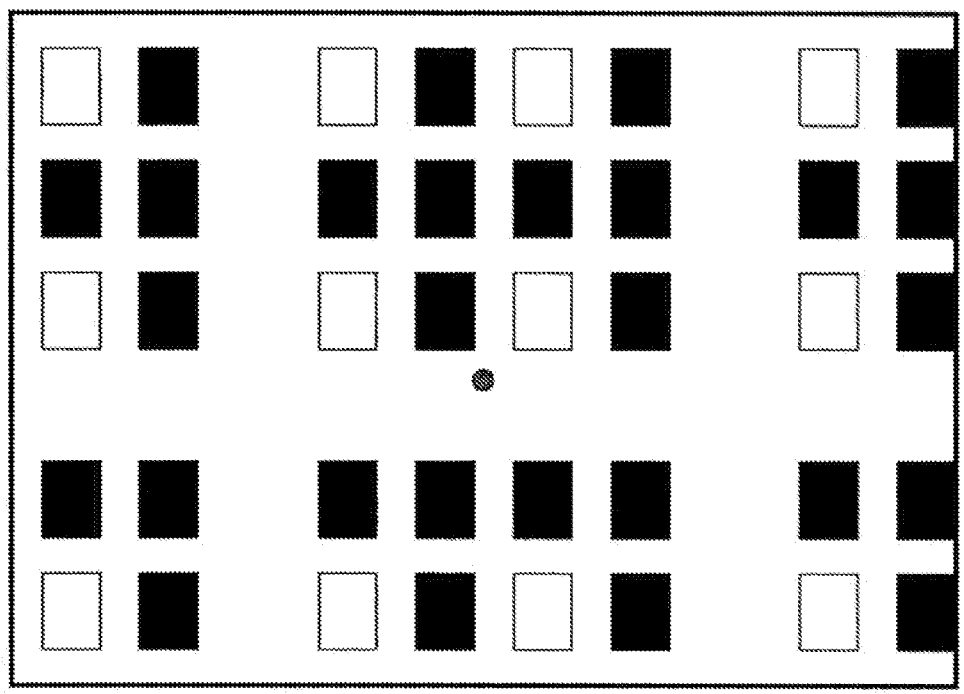
FIG. 21 shows a first example of a display screen after a zooming operation according to the present embodiment.
Figure 22:
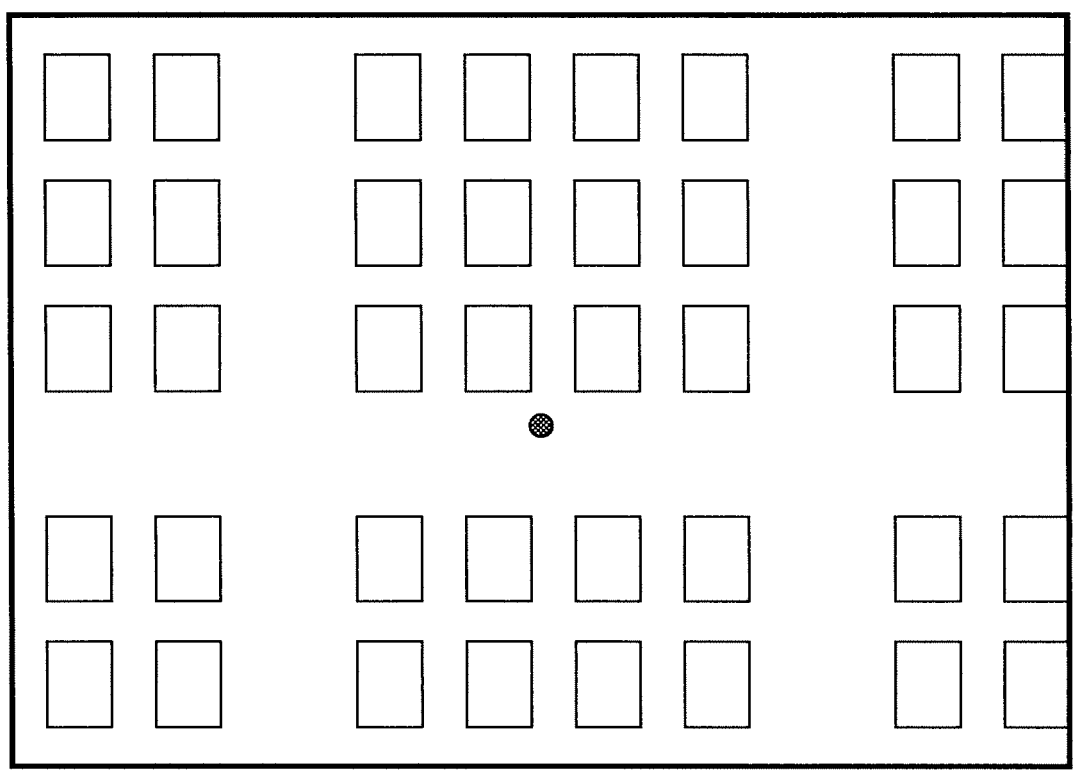
FIG. 22 shows a second example of a display screen after a zooming operation according to the present embodiment.

That is, by establishing the relationship Zm=2·Zi, a blank space allowing one image to be fitted therein can be created in response to a zooming operation of the user. For example, in the case of Zi=1.1 (i.e. image enlargement), the display screen in the initial image display of FIG. 18 is changed to a display screen shown in FIG. 20. FIG. 20 shows an example of a display screen after a zooming operation. When Zi exceeds 1.1, it is possible to display, for example, shaded images as shown in FIG. 21 in blank spaces shown in FIG. 20. Furthermore, six new groups may be displayed as shown in FIG. 22. It should be noted that the shaded images are non-representative images that are different from the representative images preliminarily selected by the user. FIGS. 21 and 22 show a first and a second example, respectively, of the display screen after the zooming operation according to the present embodiment. Herewith, both visibility of a single image and macroscopic visibility of multiple images can be improved by effectively using blank spaces in which, according to conventional techniques, no images are displayed after a zooming operation.

One preferable manner to change the initial image display having the first image group to the image display having a second image group after a zooming operation is that, when a zooming operation is performed over a targeted point, blank spaces between the representative images expand and subsequently non-representative images and non-foreground images (or parts of such images) appear in the expanded blank spaces. That is, although both blank spaces and images are expanded when a zoom-in operation is performed, it is preferable that the centroid-to-centroid distance magnification Zm is larger than the image zoom magnification Zi, particularly before the second image group is displayed.

The following describes examples of the relationship between the centroid-to-centroid distance magnification Zm and the image zoom magnification Zi of the present embodiment.

Example 1 of Relationship Between Zi and Zm $$Zm = 2 \cdot Zi \, (1 \leq Zi \leq 1.1) \qquad \text{Equation (4)}$$

$$Zm = Zi \, (0 < Zi < 1, \, 1.1 < Zi) \qquad \text{Equation (5)}$$

When the above relationship is satisfied (that is, the centroid-to-centroid distance magnification Zm has a nonlinear relationship to the image zoom magnification Zi, and the nonlinear relationship has a range ($1 \leq Zi \leq 1.1$) in which the centroid-to-centroid distance magnification Zm is set larger than the image zoom magnification Zi), the ratio of the image dimensions to blank spaces is maintained constant in a zoom-out operation and the zoom-in operation of FIG. 21.

Example 2 of Relationship Between Zi and Zm $$Zm = 2 \, (Zi = 1)$$

$$Zm = Zi \, (0 < Zi < 1)$$

When Zi is 1 or less, if the above relationship is satisfied, only blank spaces between the images can be expanded without enlarging the images. Herewith, it is possible to prevent expanding unnecessary blank spaces.

Example 3 of Relationship Between Zi and Zm $$Zm = 2 \cdot Zi \, (1 \leq Zi \leq 1.1)$$

$$Zm = Zi \, (0 < Zi < 1)$$

$$Zm = k \cdot Zi \, (1.1 < Zi) \, (k \text{ is a constant smaller than 1})$$

If the above relationship is satisfied, the centroid-to-centroid distance magnification Zm becomes smaller than the image zoom magnification Zi in the zoom-in operation of FIG. 21. Herewith, as the image display dimensions become larger, the blank spaces become smaller, thereby being able to increase the total number of display images and thus providing a rational image display.

Example 4 of Relationship Between Zi and Zm $$Zm = 2 \cdot Zi \, (1 \leq Zi \leq 1.1)$$

$$Zm = Zi \, (0 < Zi < 1)$$

$$Zm = k \cdot Zi \, (1.1 < Zi \leq p) \, (k \text{ is a constant smaller than 1}, p \text{ is a constant larger than 1.1})$$

$$Zm = Zi \, (p < Zi)$$

In the case of the previous Example 3 where k<1, images may overlap one upon another in some zoom-in operations. To prevent these images overlapping, the above relationship is effective.

Example 5 of Relationship Between Zi and Zm

The above Examples 1 through 4 illustrate the relationships between Zi and Zm for magnification and reduction displays according to zooming operations made, for example, on the input apparatus 350 (e.g. a mouse) of FIG. 16.

Example 5 relates to the case where a centering operation is made on the input apparatus 350 (e.g. a mouse) of FIG. 16 to move a focus point (e.g. a location of the mouse pointer) to the center of the screen. In this case, the following relationship may be satisfied:

$$Zm = 2, \, Zi = 1 \qquad \text{Equation (6)},$$

and parallel displacement may be performed to move the focus point to Point C.

Example 6 of Relationship Between Zi and Zm

"Group selection" below means selecting any one group, and is implemented, for example, by a right click on a circumscribed rectangle of images making up a group. In this case, the following relationship may be satisfied:

$$Zm = 2, \, Zi = 1 \qquad \text{Equation (7)},$$

and the parallel displacement like the centering operation may not be performed.

Example of Image Display Process

The image display is described above with the examples of display screens. Next describes an example of the image display process with reference to FIG. 23. FIG. 23 shows an example of an image display process according to the present embodiment.

Prior to the description of FIG. 23, DHTML (DynamicHTML) used in the present example of the image display process is explained.

A typical method for displaying multiple images in a single screen is, as used for a Web page, embedding multiple images in one HTML file by specifying a position and display dimensions of each image. Also, a typical method for detecting an event, such as a mouse movement made by the user, and dynamically changing the appearance of an object embedded in a HTML file according to the detected event is employing DynamicHTML (DHTML). DynamicHTML is used in the present example of the image display process.

In HTML and DHTML, not images themselves but viewers of images (components for displaying images) may be embedded (a typical example of this is a Web site in which video viewers are embedded). In DHTML, positions and display dimensions of the viewers and images to be displayed can be changed.

A publicly known ActiveX control is a typical implementation example of such components embedded in HTML or DHTML and used (for example, to display images) via a Web browser. ActiveX controls allowing decoding of JPEG2000 codes and image display after decoding are implemented as image viewers of the present example of the image display process. Each of the image viewers has the same display dimensions as an image to be displayed (the viewer dimensions are determined according to the image display dimensions).

The viewers used in the present example are also able to transmit a JPIP request to a JPIP server apparatus (corresponding to the image display apparatus 2 of FIG. 16) and receive and analyze a JPIP response from the JPIP server apparatus. That is, the viewers also has the function of a JPIP client (corresponding to the client apparatus 3 of FIG. 16) to interpret JPT streams.

In the present example of the image display process, thirty images of FIG. 18 are predetermined as images of the first image group, and for each image, default values of the centroid coordinates and vertical and horizontal dimensions are predetermined. Also, the shaded 28 images in FIG. 21 are predetermined as images of a non-first image group, and for each of the images, default values of the centroid coordinates and horizontal and vertical dimensions are predetermined. If the first and non-first image groups are displayed at the same time according to their default values, their images overlap one another, and therefore only the first image group is initially displayed as representatives.

FIG. 23 shows a process flow performed by the DHTML, viewers and a JPIP server. Next is described the present example of the image display process with reference to FIG. 23.

First, the DHTML determines a default display position, default dimensions and a display image for each of the viewers that display the images of the first image group (S101). The DHTML structuring a Web page reads, from a configuration file, the default display position, the default dimensions and (an URL of) the display image for each viewer.

At Step S102, the DHTML sets the display positions, display dimensions and display images with respect to all viewers on which the images need to be displayed (S102). In this step, the default values determined in Step S102 are set for all the viewers. Then, at Step S103, each viewer detects a corresponding display position, display dimensions and display image set in Step S102 (S103).

At Step S104, each viewer requests, using a JPIP request, the JPIP server for a partial code as specifying the corresponding image and display dimensions (S104). At this point, unlike in FIG. 17, each viewer does not require the full resolution level of the corresponding image; however, it is often the case that each viewer requires the entire image region and not a partial image region. Accordingly, each viewer specifies the entire region as a window region defined in the JPIP protocol.

Next, at Step S105, the JPIP server interprets each JPIP request received in Step S104, extracts a code for a resolution level closest to the display dimensions (or closest to but larger than the display dimensions), and transmits the code to each viewer which is a JPIP client (S105). At Step S106, each viewer displays a corresponding image by decoding the code received from the JPIP server and changing the size of the decoded image to required display dimensions (S106).

Then, at Step S107, the DHTML waits for detection of a zooming operation performed by the user (S107). More specifically, after each viewer finishes the first image display according to the above-mentioned steps S101 through S106 (or after Step S102), the DHTML waits for a zooming operation (e.g. rotation of the mouse wheel or clicking on the zoom button) by the user.

In the case of YES at Step S107—that is, in the case where the DHTML detects a zooming operation performed by the user (YES at S107), the process proceeds to Step S108.

At Step S108, for each viewer for the images of the first image group, the image display position and display dimensions are updated (S108). At this point, the amount of rotation of the mouse wheel in Step S107, for example, is converted into the image zoom magnification $Zi$. Then, for each of the viewers for the first image group, the image display position and display dimensions are calculated using the above-mentioned equations (1) through (5). Note that this step is for the first image group, and no update is performed on the display images themselves.

At Step S109, a judgment is made whether the image zoom magnification $Zi$ calculated in Step S108 exceeds 1.1 (S109). In the case of $Zi>1.1$ in Step S109 (YES at S109), the process proceeds to Step S110. In the case of $Zi<1.1$ in Step S109 (NO at S109), the process returns to Step S102.

At Step S110, the DHTML reads, from the configuration file, a display position, display dimensions and display image for each of all viewers other than the viewers for the first image group and calculates an image display position and display dimensions for each viewer for images of the non-first image group using the above-mentioned equations (1), (2), (3), (4) and (5). When the Step S110 is finished, the process returns to Step S102, and the DHTML sets the values of the display positions and the like read in Step S110 for all the viewers on which images need to be displayed. Then, the following steps are repeated: transmitting a request to the JPIP server; receiving a response; decoding a partial code; and displaying a corresponding image after changing the image size.

Calculation Example of Resolution Level

In the JPIP protocol, the display window size is specified by a parameter "rsiz", and a required resolution level is specified by a parameter "fsiz" defined by an x-direction size "fx", a y-direction size "fy" and the like. The display window size and resolution level are transmitted from each JPIP client to the JPIP server. The following shows an example of a format used at this point:

fsiz="fsiz" "=" x-direction size", "y-direction size ["," "closest"]

rsiz="rsiz" "=" window size in x-direction", "window size in y-direction

Figure 24:
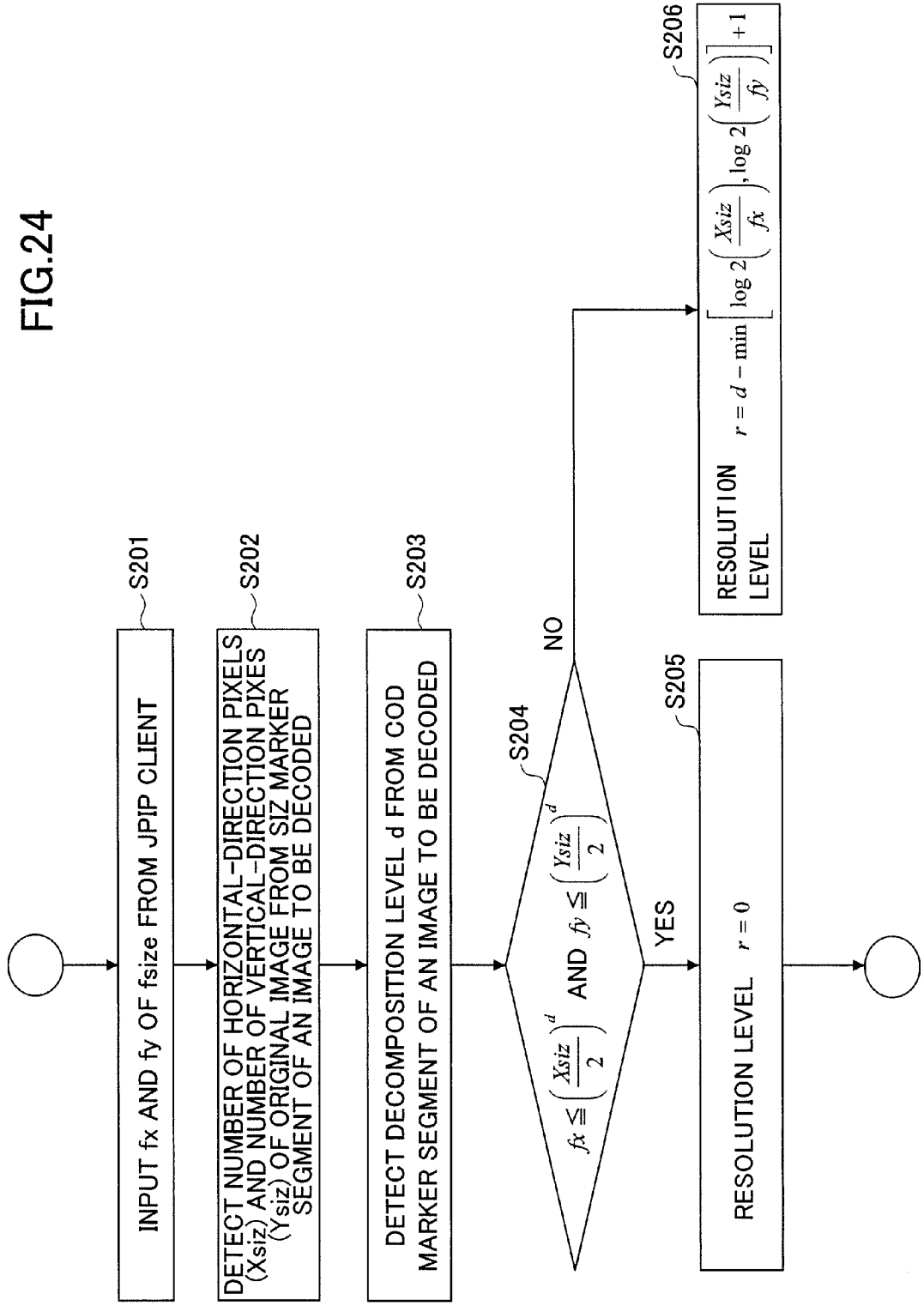
FIG. 24 shows operations for calculating a resolution level according to the present embodiment.

When specifications for a file to be displayed and its resolution level (as fsiz) are transmitted from a JPIP client, the JPIP server calculates the required resolution level in accordance with a flow shown in FIG. 24. Here, "min[a, b]" is a function to compute a smaller one of a and b, and "log 2( )" indicates that 2 is the base of the logarithm. FIG. 24 shows operations for calculating a resolution level according to the present embodiment.

Note that, in Step S107 of FIG. 23, in the case of detecting a centering operation instead of a zoom operation performed by the user, Equation (6) is used in place of the above-mentioned Equations (4) and (5). Also in the case of detecting a group selection, Equation (7) is used in place of the foregoing Equations (4) and (5).

Detection of a centering operation can be achieved by detecting an event (e.g. double clicking) preliminarily associated with the centering operation and the location of the mouse pointer at the occurrence of the event. Similarly, detection of a group selection can be achieved by detecting an event (e.g. right-clicking on a circumscribed rectangle of images making up each group) preliminarily associated with the group selection operation and the location of the mouse pointer at the occurrence of the event, and then a category of an image located closest to the mouse pointer is determined as a selected category.

Thus, although the present invention has been described herein with reference to a preferred embodiment thereof, it should not be limited to the description of the embodiment. It should be understood that various changes and modification may be made to the particular examples without departing from the scope of the broad spirit and scope of the present invention.

The embodiment of the present invention provides an image display apparatus, an image display method, an image display program and a recording medium that achieve further improvement in the visibility of a single image and the macroscopic visibility of multiple images.

What is claimed is:

1. An image display apparatus for displaying a plurality of images on a single screen, comprising:

a monitor for displaying the plurality of images, wherein each of the plurality of images includes a centroid;
an image selecting unit configured to allow a user to select a first group of images from the plurality of images
a magnification unit configured to:
  in response to a zooming operation initiated by the user, magnify distances between the centroids of the selected first group of images, and
  magnify each image of the selected first group of images; and
a display control unit configured to display in a blank space of the magnified distances one or more images different from the plurality of images, wherein
  a magnification rate of the distances between the centroids has a nonlinear relationship to a magnification rate of the selected first group of images, and
  within an extent of the nonlinear relationship, the magnification rate of the distances between the centroids has a predetermined range in which the magnification rate of the selected first of group images is larger than the magnification rate of the distances between the centroids.

2. The image display apparatus as claimed in claim 1, wherein within the extent of the nonlinear relationship, the magnification rate of the distances between the centroids has a predetermined range in which the magnification rate of the selected first group of images is equal to the magnification rate of the distances between the centroids.

3. The image display apparatus as claimed in claim 1, wherein the magnification unit magnifies the distances between centroids based on one of a zoom-in instruction and a centering instruction.

4. The image display apparatus as claimed in claim 1, wherein the plurality of images is divided into a plurality of groups, and the selected first group of images include one or more predetermined images selected from each of the groups.

5. The image display apparatus of claim 4, wherein the magnification unit magnifies the distances between the centroids based on a selection made from the groups.

6. An image display method used in an image display apparatus for displaying a plurality of images on a single screen, the image display method comprising:
  displaying the plurality of images, wherein each of the plurality of images includes a centroid;
  allowing a user to select a first group of images from the plurality of images;
  in response to a zooming operation initiated by the user, magnifying distances between the centroids of the selected first group of images, and magnify each image of the selected first group of images; and
  displaying in a blank space of the magnified distances one or more images different from the plurality of images, wherein
    a magnification rate of the distances between the centroids has a nonlinear relationship to a magnification rate of the selected first group of images, and
    within an extent of the nonlinear relationship, the magnification rate of the distances between the centroids has a predetermined range in which the magnification rate of the selected first of group images is larger than the magnification rate of the distances between the centroids.

* * * * *